United States Patent [19]

Bates et al.

[11] Patent Number: 4,567,915

[45] Date of Patent: Feb. 4, 1986

[54] ANTI-CAVITATION LOW-NOISE CONTROL VALVE CAGE TRIM FOR HIGH PRESSURE REDUCING SERVICE IN LIQUID OR GASEOUS FLOW

[75] Inventors: Charles L. Bates, Mapleton; Fred M. Cain, Orem, both of Utah

[73] Assignee: Valtek Incorporated, Springville, Utah

[21] Appl. No.: 579,133

[22] Filed: Feb. 10, 1984

[51] Int. Cl.⁴ .................. F15D 1/00; F16K 47/00; F16K 47/08
[52] U.S. Cl. .......................... 138/42; 138/40; 138/43; 137/625.3; 137/625.37; 251/127
[58] Field of Search .................. 138/40, 42, 43, 46; 137/625.28, 625.3, 625.37; 251/127; 181/268

[56] References Cited

U.S. PATENT DOCUMENTS 3,917,221 11/1975 Kubota et al. ................ 138/42 X
3,954,124 5/1976 Self .................................. 138/42
3,987,809 10/1976 Baumann ........................ 138/42

FOREIGN PATENT DOCUMENTS 3215224 11/1983 Fed. Rep. of Germany ........ 138/42

Primary Examiner—James E. Bryant, III
Attorney, Agent, or Firm—Thorpe, North & Western

[57] ABSTRACT

A valve trim cage assembly for anti-cavitation control valves comprises a plurality of concentrically nested, cylindrical sleeves with fluid flow constricting annular channels defined between adjacent sleeves. Each sleeve has an indentical multiplicity of radial plenum holes contained therein which serve as expansion chambers, each plenum hole intersecting at least one flow constricting channel to provide tortuous fluid flow paths of alternating expansion plenum holes and constricted annular channels radially through the cage assembly. The cross sectional area of the channels increase from sleeve to sleeve in the direction of fluid flow to provide staged and gradually decreasing pressure reduction as the flow proceeds through the cage assembly. The area of the plenum holes is much greater than the total cross sectional area of all annular channels intersecting the plenum hole such that the channels are always flow restricting and the plenums are expansion chambers.

16 Claims, 10 Drawing Figures

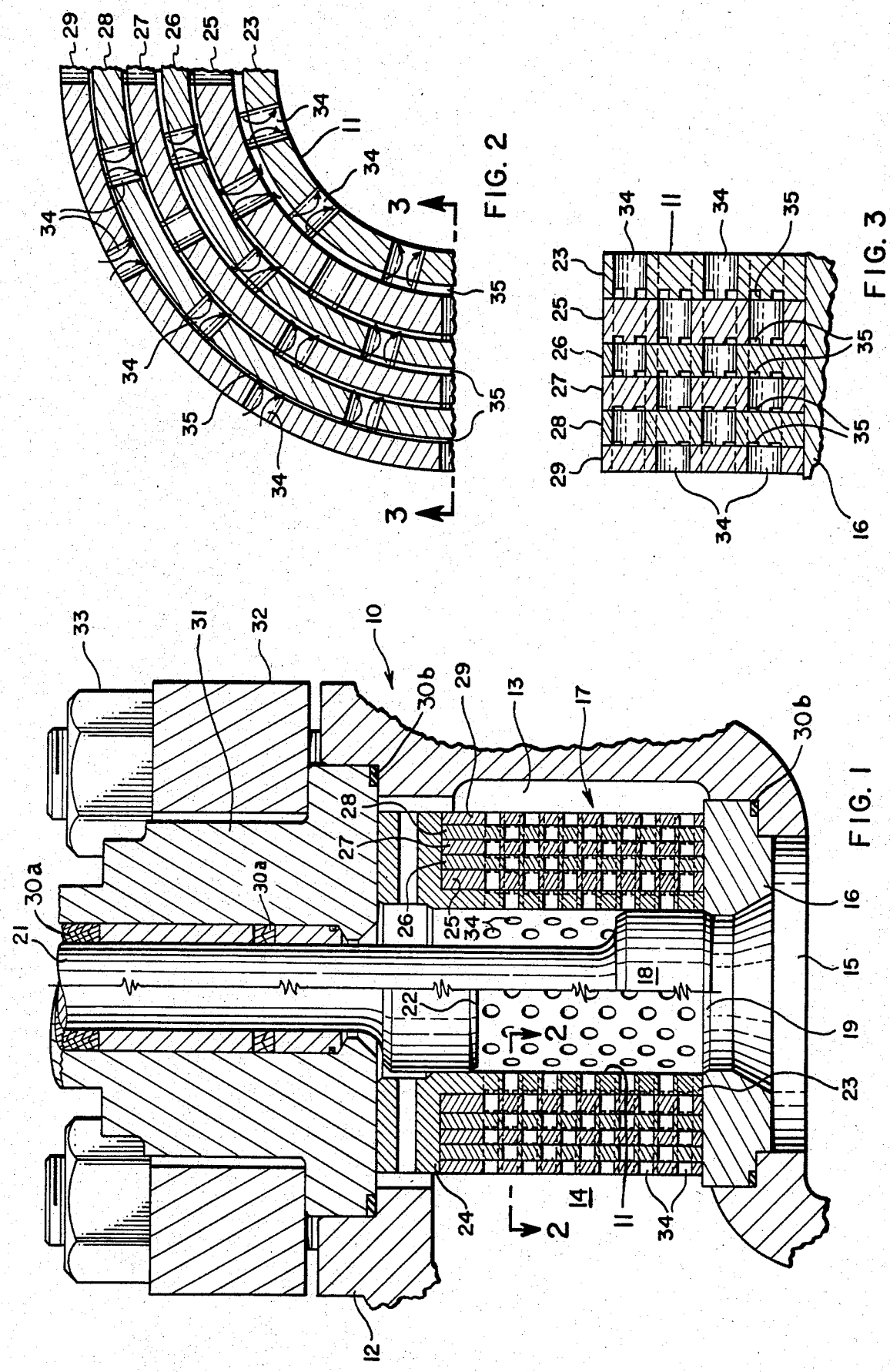

ANTI-CAVITATION LOW-NOISE CONTROL VALVE CAGE TRIM FOR HIGH PRESSURE REDUCING SERVICE IN LIQUID OR GASEOUS FLOW

BACKGROUND OF THE INVENTION

The present invention relates to a valve trim cage assembly for control valves in high pressure fluid transfer systems.

In high pressure fluid transfer systems, control valves produce a throttling effect on the fluid flow with consequent reduction in pressure occurring across the valve. Any significant, abrupt pressure drop in such a system may generate severe noise in a gas or cause cavitation in a liquid, i.e., vaporization followed by implosive condensation, with resultant damage to system components due to vibration and/or erosion. The pressure drop across the valve is accompanied by a corresponding increase in velocity of fluid flow through the valve. To overcome the adverse effects of the orifice action of the valve, it has become common practice to so design the valve trim as to break up the flow through the valve into a multitude of small streams which are then led through convoluted paths to produce energy losses in the fluid. This has resulted in a variety of constructions for valve trims, such as stacks of disks, perforated strips wound upon themselves, and cylindrical sleeves nested within one another.

In U.S. Pat. Nos. 3,513,864 and 3,514,074 the flow is subdivided through interconnected openings in disk-shaped grids and through tortuous passages formed in the surfaces of superposed disks. In either case the subdivided streams are led through small, elongated passages with many abrupt turns creating a drag and pressure drop on the fluid.

In U.S. Pat. No. 3,954,124 a valve trim cage assembly is formed from a number of cylindrical sleeves of graduated sizes are nested concentrically. The sleeves are provided with annular passageways or chambers on one surface which serve as expansion chambers and communicate through small restrictive radial orifices to the opposite surface. The restrictive radial orifices and circumferential expansion passageways provide a tortuous path through the sleeve assembly.

The valve trim cages heretofore known have been generally effective in controlling the abrupt pressure drop encountered in high pressure fluid transfer systems, but in many cases have proven to be impractical for commercial use. The complex shapes required have necessitated a variety of different manufacturing processes and painstaking machining to produce the tortuous paths specified. In addition, the concentric sleeved trim cages proposed in the prior art, as illustrated in U.S. Pat. No. 3,954,124, have tiers of wide, deep annular chambers covering one entire surface of each sleeve. These chambers serve as expansion chambers wherein the flow streams exhausting into them from the restrictive radial orifices impinge upon the sidewalls of the chambers causing damage due to erosion. Moreover, frictional losses are minimized by the shortness of the pathway through the radial orifices as compared to the expansion pathway through the annular chambers.

OBJECTS AND SUMMARY OF THE INVENTION

An object of the present invention is to provide a valve trim cage assembly for fluid flow which provides staged pressure reductions which gradually decrease from stage to stage.

Another object is to provide a valve trim cage assembly which directs fluid through alternating radial expansion chambers and narrow constricted annular channels to develop substantial frictional losses in the flow.

Still another object is to provide a valve trim cage assembly wherein fluid streams entering into an expansion chamber impinge upon each other instead of directly on a metal boundary thereby minimizing erosion.

A further object is to provide a valve trim cage assembly which can be manufactured with conventional methods from materials typically used in control valves.

The above objects and others not specifically recited are realized in the present invention by provision of a valve trim cage assembly which functions as an energy loss control assembly in high pressure fluid transfer systems. The trim cage comprises a plurality of concentric cylindrical sleeves having a multiplicity of radial expansion chambers, referred to as plenum holes or plenums, interconnected by one or more constricted annular channels. The plenums and channels are arranged in stages with the cross section area of the annular channels increasing gradually from stage to stage in the direction of fluid flow.

DRAWINGS

The best mode presently contemplated of carrying out the invention will be understood from the detailed description of the several embodiments illustrated in the accompanying drawings in which:

FIG. 1 is a cross sectional elevation view of a valve trim cage assembly of a flow-over-plug design mounted in a high pressure fluid control valve, the plug being divided to show both open and closed positions;

FIG. 2 is a plan view in section, and at an enlarged scale, of a segment of the valve trim cage assembly taken along lines 2—2 of FIG. 1;

FIG. 3 is an elevation view in section taken along line 3—3 of FIG. 2;

DETAILED DESCRIPTION OF THE ILLUSTRATED EMBODIMENTS

Figure 6:
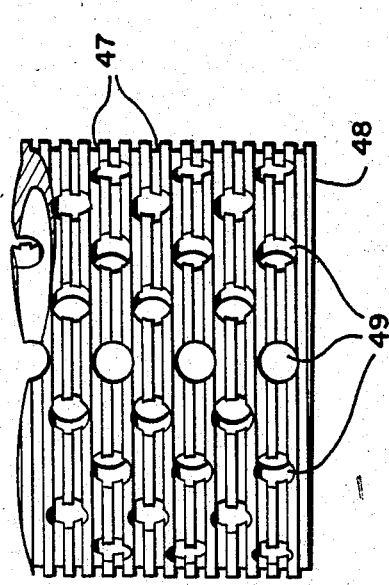
FIGS. 6 and 7 are elevation views of portions of modified sleeves at the cage assembly configured with spiraling annular channels of various pitches for use with the designs of FIGS. 2 and 4.

As shown in FIG. 1, a control valve 10 includes a housing 12 having a central fluid chamber 13 which communicates to the exterior of the housing through angularly related passages 14 and 15 for the entrance and/or exit of fluid. A pressure reduction assembly includes a valve seat ring 16, valve trim cage assembly 17 and a movable plug 18 slidable through a bore 11 forming the central core of valve trim cage 17. The seat ring 16 is positioned in a housing recess surrounding the passage 15 and is provided with a beveled seating angle 19. The plug 18 is mounted on one end of an axially movable rod 21 in alignment with seat ring 16. A beveled surface or seating angle 22 on the plug 18 is adapted to bear against the seating angle 19 and close the passage 15 when the plug is moved down against the seat ring. The valve trim cage assembly 17 includes a cylindrical sleeve 23 defining a bore 11 with a radially extending collar 24 at one end thereof. A plurality of additional sleeves 25–29 of graduated sizes are nested around sleeve 23 in a closely fitted concentric manner to complete the trim cage. The valve trim cage 17 is positioned in the fluid chamber 13 above the seat ring 16 closely surrounding the plug 18 and is clamped or sealed in place by means of a bonnet 31, a flange 32, flange bolting 33, and appropriate packing 30a and gaskets 30b. The cylindrical plug 18 is actuated in a reciprocating fashion within the bore 11 of the valve trim cage 16 by means of any suitable actuator. The plug 18 controls the flow through the valve trim cage by covering or uncovering plenum holes 34 in the inner sleeve 23 which opens to the core 11. The plug 18 fits within the bore 11 with small clearance to prevent significant leakage by the plug and allow sliding movement of the plug within the bore.

The valve construction of FIG. 1 is a flow-over-plug design in which fluid enters through passage 14, passes radially inwardly through the valve trim cage 17 into bore 11 and exits through passage 15. The valve trim cage is configured to facilitate this direction of fluid flow. Each sleeve of the trim cage 23, 25, 26, 27, 28 and 29 is provided with an identical multiplicity of radially extending plenum holes 34 of round or other convenient shape arranged in axially and circumferentially spaced rows. The plenums in each circumferential row are spaced by a uniform distance equal to at least twice the diameter or dimension of the plenums in the circumferential direction. The circumferential rows are closely spaced axially of the sleeve to minimize or eliminate deadband between rows without overlapping of the plenums in the axial direction. The plenums of adjacent axial rows may be in a straight pattern or in an offset pattern. If arranged in an offset pattern the plenums of adjacent axial rows will be circumferentially offset, such that the plenums in alternate rows will be aligned axially of the sleeve in parallel columns. The offset pattern may be somewhat easier to manufacture and allows the plenum holes to be closer together. Therefore as described, the pattern of plenums in each sleeve in the assembly has the same angular and axial spacing as every other sleeve in the valve trim cage.

The number of sleeves in the valve trim cage may vary. There must be at least two stages or three sleeves. The maximum number of sleeves will depend upon the application and size of valve. Generally speaking, six stages or seven sleeves will be sufficient for most uses.

Each of the sleeves, except one, is provided with small annular channels 35 in one surface extending between the adjacent plenums in each circumferential row. One or more channels are provided for each row of plenums. Two such channels are illustrated in FIGS. 1 and 3. For some applications one channel may be sufficient. However, two or more channels may be preferable to maximize energy loss by friction through the channels. The actual number of channels depends somewhat on manufacturing convenience. For example, it may be easier to have an odd number of channels so that the drill point for drilling plenum holes will center easier. What is important is that the cross sectional area of the plenum hole be at least 1.5 times greater than the total cross sectional area of the channels intersecting said plenum hole. The sleeves of the cage are assembled such that the plenums in adjacent sleeves are offset or staggered. The sleeves are so dimensioned as to nest concentrically in a fluid tight relationship. In this manner the opposed surface of each sleeve covers the channels in the next adjacent sleeve to form enclosed fluid constricting channels between plenums. As shown, the outermost sleeve 29 is not provided with channels, but covers the channels of sleeve 28. However, while the channels 35 are shown as machined or otherwise formed in the exterior surfaces of sleeves 23 and 25–28, they may alternatively be formed in the interior surfaces of sleeves 25–29. In such cases, the innermost sleeve 23 would not be channeled.

The walls of the individual sleeves may be formed of any desired thickness. It requires that they be thick enough to machine without dimensional distortions and the thickness must bear the axial loads from gasket and fluid pressure forces. Regardless of the wall thickness, it is essential that the cross sectional area of the respective channels 35 increase from sleeve to sleeve in the direction of fluid flow through the retainer assembly. As shown in FIGS. 1–3, the channels are formed progressively deeper from sleeve 28 to sleeve 23 while the width is maintained constant. If desired, the width can also be varied to achieve the desired variation in cross sectional area of the channels.

The design of the annular channels 35 in each stage and their cross sectional area ratio from sleeve to sleeve are critical design features. It is obvious that if the plenums are to serve as expansion chambers, the total cross sectional area of the annular chambers leading into a plenum hole must be less than the cross sectional area of the plenum hole. In order to obtain the maximum energy loss through friction, it is desirable that the area ratio of plenum cross section to the total cross sectional area of all annular chambers feeding into a plenum be as great as possible. Ratios will also depend upon the number of stages in the valve trim. At the last stage on the downstream side, i.e., sleeve 23, the ratio of plenum area to annular channel area will preferably be between about 3:1 to 1.5:1. On a trim containing five or six stages, the first or most upstream stage may contain annular channels whose total cross sectional areas may bear a ratio to the cross sectional area of the plenum they feed into of between about 1:20 to 1:15. In other words, the cross sectional area of the plenum may be 15 to 20 times greater than the total cross sectional areas of the annular chambers feeding into that plenum at the most upstream stage and the plenum area will be 1.5 to 3 times greater at the outlet downstream stage. These upstream stage ratios are exemplary only and may actually be much greater or less depending upon the desired application and the number of stages. The only critical limitation is that the plenum hole be at least 1.5 times as great as the total cross sectional areas of the channels feeding in to it as already stated. As also previously stated, the cross sectional area of the annular channel may be varied by either deepening or widening the channel. In order to preserve the strength of the sleeve, the sleeve thickness should be at least three to five times as thick as the depth of the channel.

The general course of fluid flow through the valve trim cage 17 is depicted in FIG. 2. Fluid enters the trim cage 17 through the plenum holes 34 in the outer sleeve 29 then enters channels 35 in sleeve 28 and flows circumferentially in both directions to the plenums in sleeve 27. Flow then continues in a similar manner through sleeves 26, 25 and 23 into the central bore 11 of the trim cage 17. The narrow annular channels 35 in each stage and their variation in cross sectional area from sleeve to sleeve are important design features of the present valve trim cage assembly. Heretofore, energy loss control devices for cavitation and noise reduction which utilize concentric sleeve cages have relied upon radial orifices as flow restricting means and annular passageways as the expansion and mixing chambers. The present valve trim assembly is in contrast with the traditional technology in that the radial plenums through each sleeve are designed only as expansion and mixing chambers and do not function as flow restrictions. The restrictive feature of this valve trim cage assembly is the narrow annular channels circumferentially linking adjacent plenums. The cross sectional area of the annular channels is increased from stage to stage in the direction of fluid flow, so as to produce staged and gradually decreasing pressure reductions as the flow proceeds through the valve trim cage assembly. The larger pressure reductions occur at the upstream stages of the cage where cavitation is less likely. The size and number of the annular channels in a cage is determined to create maximum frictional pressure reduction. Hence, two or more channels between adjacent plenum holes are desirable. It may also be desirable to reduce the hydraulic radius (cross sectional area divided by the wetted perimeter) of the channel with respect to the length of the channel. In addition to providing maximum frictional losses, the small cross sectional area of the annular channels helps prevent formation of large, high energy cavities in the flow. The elongated, narrow, circumferential channels between plenums provide for a pressure profile which is less likely to cavitate than is a radial orifice. The flow contraction at the entrance to each annular channel is less severe than the vena contracta through a typical radial orifice found in most prior known multi-sleeve cage devices. The flow of fluid then loses energy through friction in the annular channel. The stream exits each stage into the next plenum hole, which serves as a sudden area enlargement, in boundary layer separation, deceleration of the fluid against the opposing fluid jet, and turbulent mixing which drops the pressure to the static pressure in the plenum without large pressure excursion and recovery typical of flow through a sharp-edged orifice or a venturi restriction.

Figure 4:
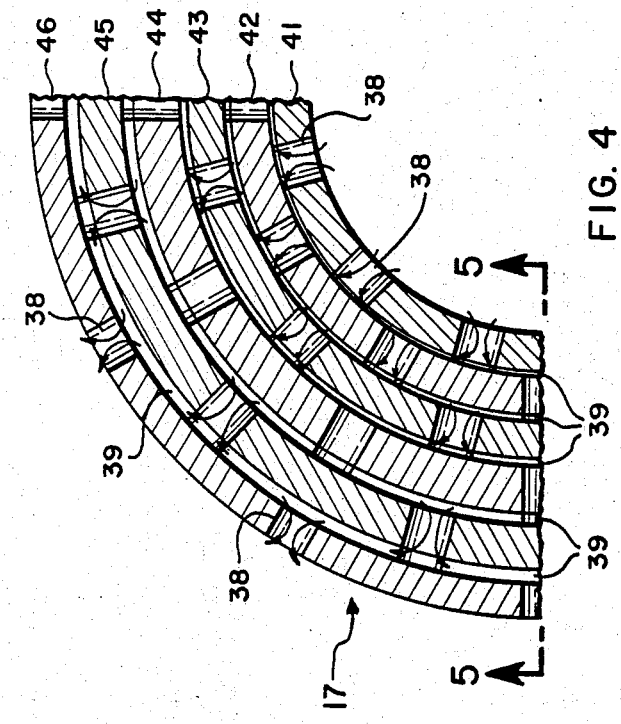
FIG. 4 is a plan view in section, and at an enlarged scale, of a second embodiment showing a segment of a valve trim cage assembly of a flow-under-plug design.
Figure 5:
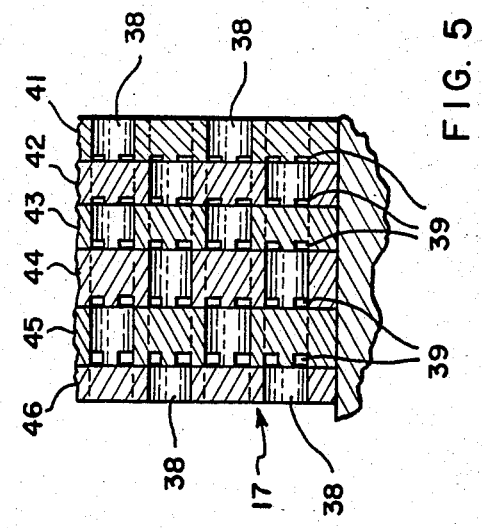
FIG. 5 is an elevation view in section taken along line 5—5 of FIG. 4.

Referring to FIGS. 4 and 5, a flow-under-plug design is depicted in which fluid enters the cage assembly through the plenums 38 in the inner sleeve 41, flows radially outwardly through the valve trim cage assembly and is discharged through plenums 38 in the outer sleeve 46. In this configuration, as in that of FIGS. 1-3, the valve trim cage assembly 17 includes a plurality of concentric sleeves and each sleeve is provided with an identical multiplicity of radially extending plenums 38 and each sleeve, except one, is provided with narrow annular channels 39. The sleeves 41-46 are nested closely within each other in a fluid tight relationship and the plenums 38 are aligned and spaced in each sleeve similar to those of FIGS. 1-3. The annular channels 39 are formed in one surface of each sleeve, except the outer sleeve 46 in the direction of flow. As in FIGS. 1-3, the annular channels connect adjacent plenums of each row and the cross sectional area of the channels is increased progressively in the direction of fluid flow from stage to stage, i.e., from sleeve 42 to sleeve 46. The flow of fluid through the various stages of the trim assembly is similar to that of FIGS. 1-3, but in the opposite direction. However, the valve trim performs in the same way to accomplish the same energy loss control result.

Figure 7:
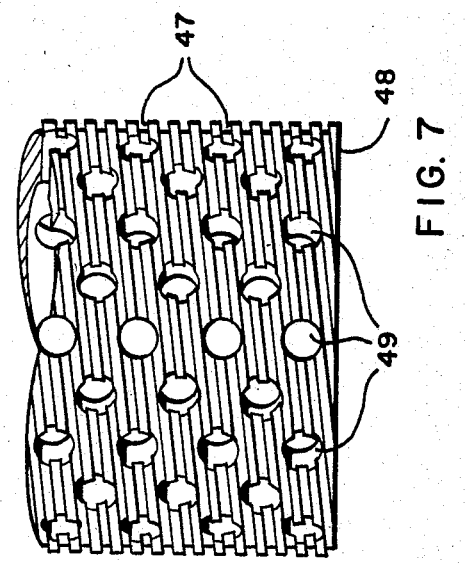

In the embodiments of FIGS. 6 and 7 the annular channels 47 are segments of a continuous spiral formed in the exterior surface of a cage sleeve 48. Radial plenums 49 are arranged in rows and columns as before, with adjacent plenums of each circumferential row connected by the channels. In addition, at least some plenums in each circumferential row are connected to plenums in adjacent circumferential rows by the spiral channels. In order to accomplish this, a coil in the spiral must intersect the circumferential row of plenums with an adjacent circumferential row of plenums. With this arrangement, the fluid is allowed to expand axially of the sleeves as well as radially. Each sleeve, except one, is machined or otherwise formed with at least one restrictive, spiral channel of rectangular or other convenient cross section which intersects each plenum or expansion plenum at least once. As with the previous embodiment, two or more channels may be preferable. Alternate designs and flow characteristics may be achieved by varying the number of separate spirals, the pitch of the spirals, and the number of intersections with each row of plenums.

Figure 8:
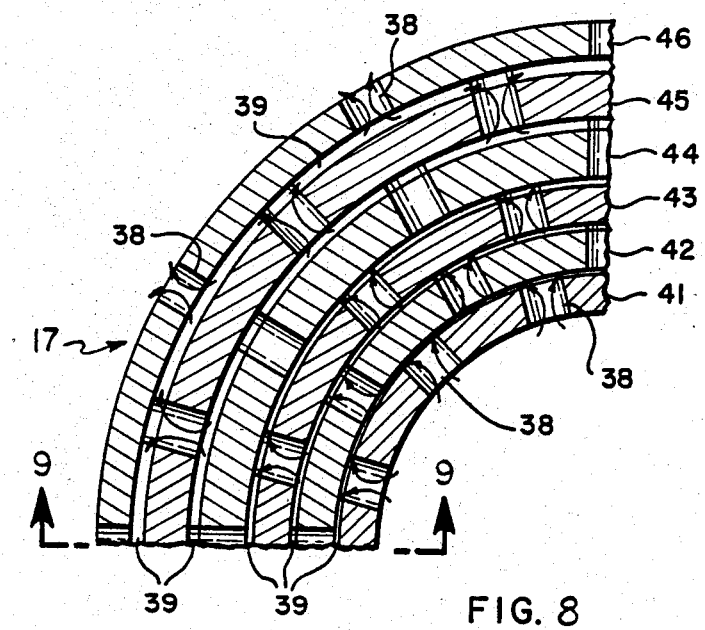
FIG. 8 is a plan view similar to that of FIG. 4, but showing a modification in the trim cage assembly wherein the annular channels are formed in the inner cylindrical surfaces of the nested, cylindrical sleeves of the valve trim cage assembly.
Figure 9:
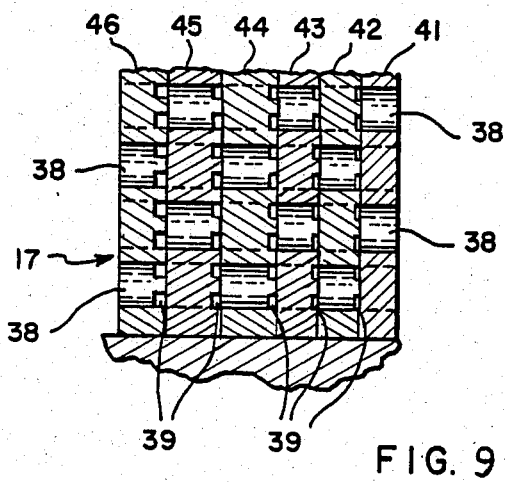
FIG. 9 is an elevation view in section taken along line 9—9 of FIG. 8.

In the embodiment shown in FIGS. 8 and 9, the annular channels 39 are formed in the inner surfaces of each of the sleeves 42, 43, 44 and 45. The innermost sleeve 41 has no channels. Otherwise the embodiment of FIGS. 8 and 9 is identical in construction and operation to the embodiment shown in FIGS. 4 and 5, and the various parts of the embodiment of FIGS. 8 and 9 are identified with the same reference numbers as the corresponding parts of the embodiment of FIGS. 4 and 5.

The flow characteristics through the valve trim cage may be altered to suit customer specified demands by varying the number of available plenums in a circumferential row thereby lengthening the channels between plenum holes at the lower or closed end of the cage. The area ratio between channels may also vary from stage to stage and axially along each sleeve to produce a specific flow characteristic. Thus, the flow characteristic may be linear with respect to axial cage opening by movement of the plug through the bore or may be modified to an equal percentage or other customer specified characteristic.

Figure 10:
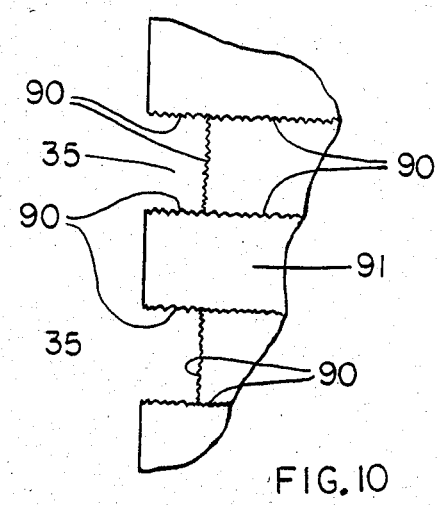
FIG. 10 is an enlarged partial vertical view of two channels in the surface of one of the cylindrical sleeves of the valve trim cage assembly showing the channels having roughened surfaces.

The simple geometry of the present design permits easy fabrication with conventional machining techniques, such as drilling and turning, with consequent savings in time and expense. For example, it is much easier to form small channels in each sleeve instead of large ones which require the removal of significant amounts of metal. In addition, it is also more rapid and efficient to drill large plenum holes as opposed to drilling very small holes which cause excessive drill failures. In addition, the present arrangement of radial, expansion plenums and narrow, annular channels produces significant energy losses due to skin friction in the long restrictive channels, large sudden flow area enlargement losses and boundary layer separation losses when the flow exhausts from the channels into the plenums and large turbulent mixing losses within the plenums. Also, the flow streams exhausting into each plenum impinge upon each other rather than striking directly upon a metal boundary, thus minimizing pressure recovery and damage from erosion. The narrow channels reduce gaseous noise by changing the spectral characteristics of the regenerated exhaust noise. By increasing the roughness of the surfaces of the channels by mechanical, chemical or other suitable means the desirable frictional resistance and energy dissipation characteristics of the channels can be enhanced. Roughened surfaces 90 in one of the cylindrical sleeves 91 of the channels 35 are shown in FIG. 10. The surfaces 90 as shown in FIG. 10 have been roughed by chemical or mechanical means.

While the invention has been described with reference to specifically illustrated preferred embodiments, it should be realized that various changes may be made without departing from the disclosed inventive subject matter particularly pointed out and claimed herebelow.

We claim:

1. In a fluid control valve having an inlet and an outlet, a cavitation and noise resistant valve trim cage assembly comprising a plurality of cylindrical sleeves nested concentrically within one another, each sleeve containing an identical multiplicity of radial plenum holes spaced apart circumferentially and axially in rows, the plenum holes in each circumferential row being spaced by at least two plenum hole diameters, each of said sleeves, except the innermost or outermost sleeve, containing a multiplicity of elongated narrow annular flow constricting channels in one surface thereof, said channels being so located as to provide at least one annular channel between adjacent plenum holes in each circumferential row, said sleeves being adapted to be concentrically nested in an offset relationship such that the plenum holes in one sleeve will not be in alignment with the plenum holes of an adjacent sleeve provided that any given plenum hole will communicate through said channels with neighboring offset plenum holes contained in the same circumferential row of an adjacent sleeve, the total cross sectional area of the annular channels leading into any given plenum hole being less than the cross sectional area of that plenum hole, thereby providing tortuous elongated flow paths through said sleeve of said valve trim wherein the annular channels serve as flow constricting passageways and the plenum holes serve as expansion chambers.

2. A valve trim cage assembly according to claim 1 wherein said annular flow constricting channels are arranged to provide at least two channels between adjacent plenum holes in a circumferential row.

3. A valve trim cage assembly according to claim 2 wherein the dimensions of the annular flow constricting channels vary from sleeve to sleeve such that the cross sectional area of the channels increases progressively from sleeve to sleeve in the direction of fluid flow.

4. A valve trim cage assembly according to claim 3 wherein the annular flow constricting channels are on the inner surface of the sleeves, the cross sectional area of the channels increases radially inwardly from the outermost sleeve to the next to innermost sleeve and wherein the innermost sleeve contains no channels.

5. A valve trim cage assembly according to claim 3 wherein the annular flow constricting channels are on the outer surface of the sleeves, the cross sectional area of the channels increases radially inwardly from the next to the outermost sleeve to the innermost sleeve and wherein the outermost sleeve contains no channels.

6. A valve trim cage assembly according to claim 3 wherein the annular flow constricting channels are on the inner surface of the sleeves, the cross sectional area of the channels increases radially outwardly from the next to the innermost sleeve to the outermost sleeve and wherein the innermost sleeve contains no channels.

7. A valve trim cage assembly according to claim 3 wherein the annular flow constricting channels are on the outer surface of the sleeves, the cross sectional area of the channels increases radially outwardly from the innermost sleeve to the next to outermost sleeve and wherein the outermost sleeve contains no channels.

8. A valve trim cage assembly according to claim 3 wherein the annular flow constricting channels each form a complete circle about the sleeve such that the channels are segments of circles between adjacent plenum holes.

9. A valve trim cage assembly according to claim 3 wherein the annular flow constricting channels are made up of a continuous spiral extending axially along the surface of the sleeve from one end of the sleeve to the other such that the channels are segments of spirals between adjacent plenum holes.

10. A valve trim cage assembly according to claim 9 wherein the spiral pitch is sufficient that each coil of the spiral interconnects one circumferential row of plenum holes with an adjacent circumferential row of plenum holes.

11. A valve trim cage assembly according to claim 3 wherein the ratio of plenum hole area to the total cross sectional area of the annular flow constricting channels intersecting a plenum hole at the most downstream sleeve is at least 1.5:1.

12. A valve trim cage assembly according to claim 11 wherein there are a minimum of three sleeves.

13. A valve trim cage assembly according to claim 3 wherein each axial row of plenum holes is offset from adjacent axial rows such that said axial rows are alternately aligned.

14. A valve trim cage assembly according to claim 3 wherein the circumferential channels contain surfaces which have been roughened to enhance frictional resistance and energy dissipation properties.

15. A valve trim cage assembly according to claim 3 wherein the number of plenum holes in a circumferential row of a sleeve may vary from row to row provided each sleeve contains an identical multiplicity of plenum holes.

16. A valve trim cage assembly according to claim 3 wherein the ratio of plenum hole area to the total cross sectional area of the annular flow constricting channels intersecting a plenum hole may vary axially along a sleeve.

* * * * *